Dec. 12, 1950 C. L. COOK ET AL 2,533,435
SUBSOILER
Filed Dec. 6, 1945 2 Sheets-Sheet 1
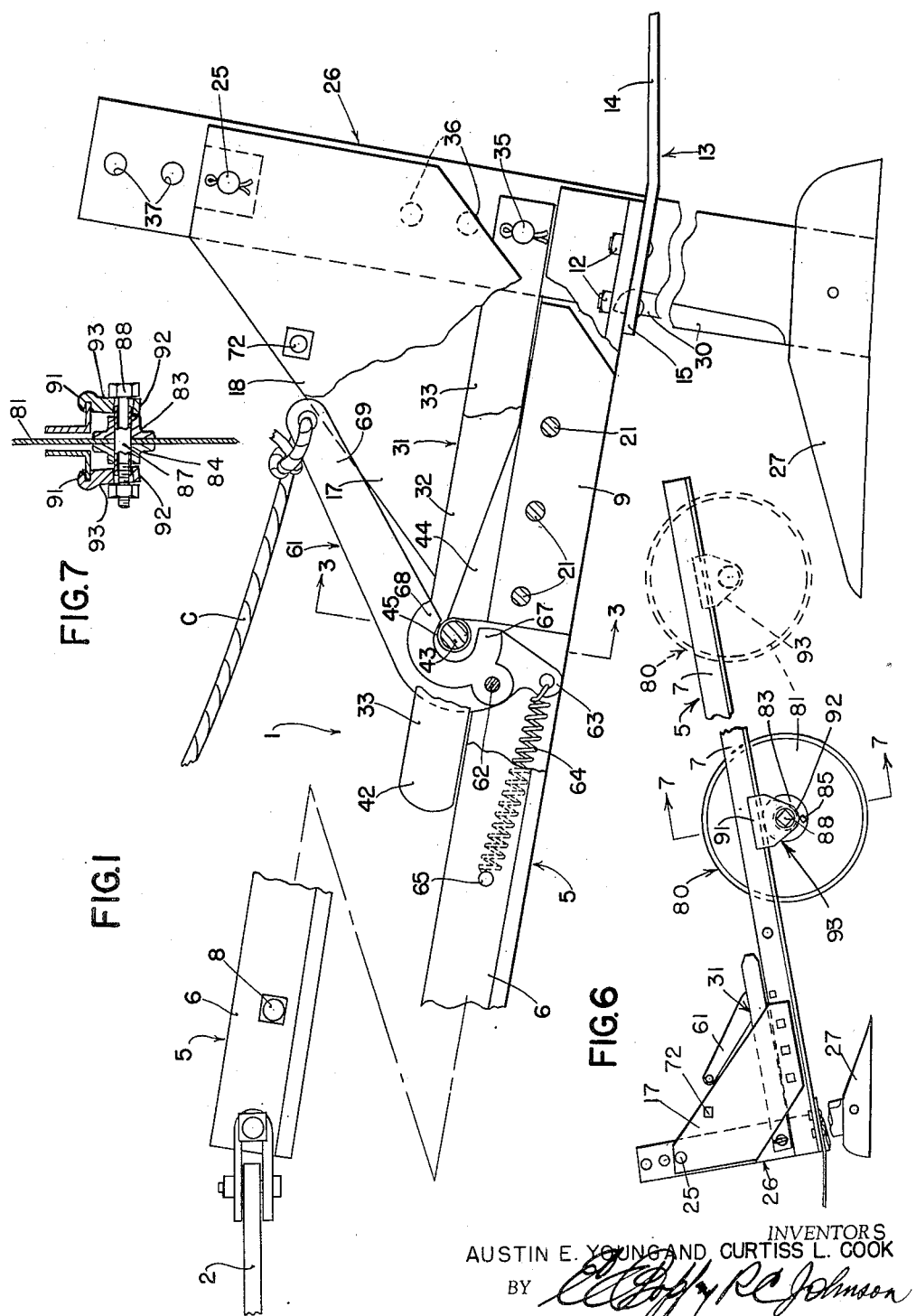
INVENTORS
AUSTIN E. YOUNG AND CURTISS L. COOK
BY
ATTORNEYS.

Dec. 12, 1950
C. L. COOK ET AL
2,533,435
SUBSOILER
Filed Dec. 6, 1945
2 Sheets-Sheet 2
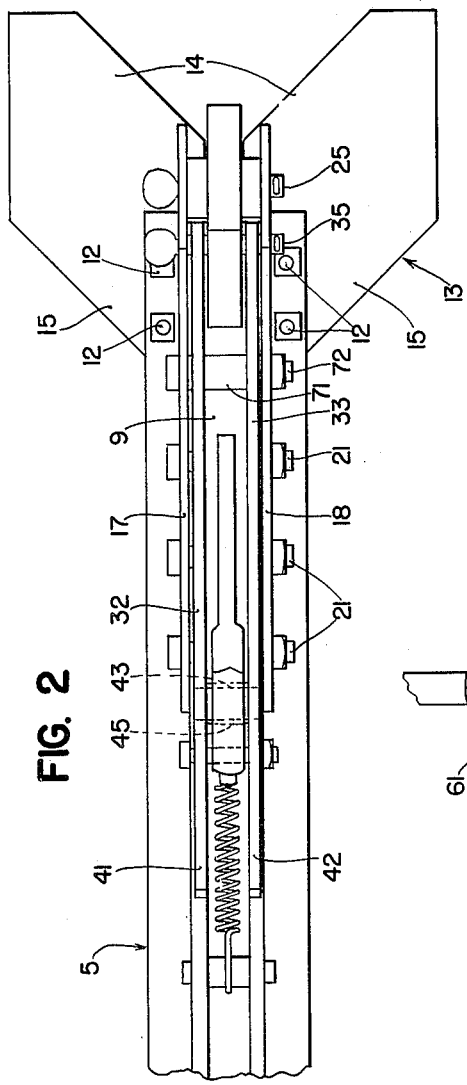
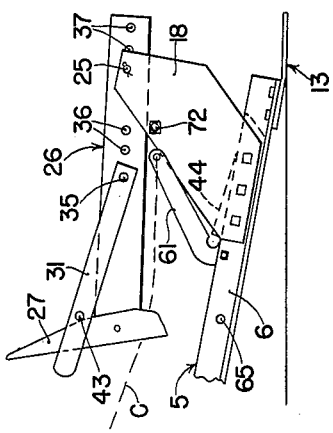
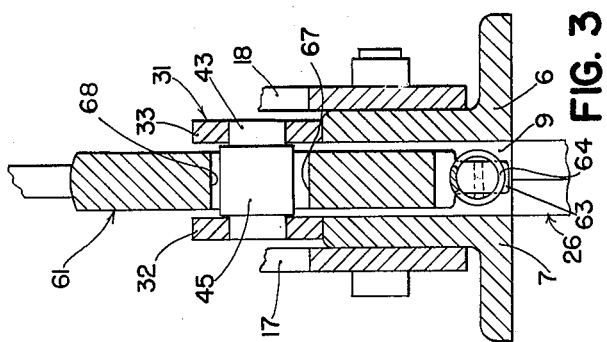
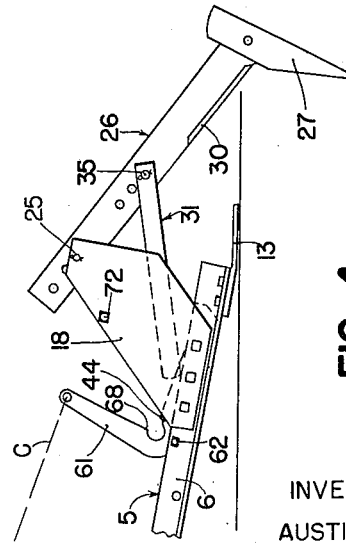
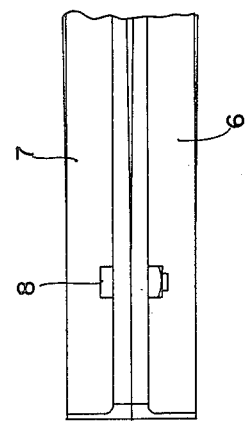
INVENTORS
AUSTIN E. YOUNG
CURTISS L. COOK
BY *(signature)*
ATTORNEYS.

Patented Dec. 12, 1950

2,533,435

UNITED STATES PATENT OFFICE 2,533,435

SUBSOILER

Curtiss L. Cook and Austin E. Young, Syracuse, N. Y., assignors to Syracuse Chilled Plow Co., Inc., Syracuse, N. Y., a corporation of New York Application December 6, 1945, Serial No. 633,064

10 Claims. (Cl. 97—78)

The present invention relates generally to agricultural implements and more particularly to soil working tools.

The object and general nature of the present invention is the provision of a new and improved subsoil plow or subsoil breaker especially adapted for general subsoil breakage but which is so constructed and arranged that the subsoil point is releasable after contact with a stone or other obstruction in the ground. Heretofore, when operating with prior known subsoilers, if the same should happen to become engaged under a stone or other obstruction, it was frequently necessary to unhook the tractor and drive around to the rear of the subsoiler and hitch to the rear end thereof in order to pull the subsoiler away from the obstruction. The principal feature of the present invention lies in the provision of a subsoiler in which the subsoiler point is carried upon a shank that is pivoted to the frame or beam of the plow and normally held in operating position against rearward swinging by suitable latch means but in which provision is made for releasing the latch whenever necessary so that the point may swing rearwardly away from the obstruction upon the further advance of the tool in a normal forward direction. This eliminates any necessity for unhitching the tractor and driving around to the rear in order to pull the tool away from the obstruction.

Another feature of the present invention is the provision of an improved subsoil plow in which the plow beam is made up of a member, or members, which extends generally forwardly and upwardly from the tool shank and is provided with relatively short ground engaging shoe means, disposed principally rearwardly of the shank, so as to provide a structure in which trash and the like readily frees itself from the tool. A subsoiler of this type can be operated under weedy conditions where subsoilers having relatively long shoes tend to be forced out of the ground by trash and the like accumulating underneath the long shoes.

A further feature of this invention is the provision of a subsoiler in which the subsoiler tool may be swung upwardly and over and forwardly into a transport position and held in that position by simple but effective means, and another particular feature of the present invention is the construction of latch means for releasably holding the shank in an operating position and which, nevertheless, readily accommodates the disposition of the shank into the aforesaid transport position.

It is an additional feature of the present invention to provide a subsoil plow or similar tool in which the tool itself can be released from the beam so as to permit passing over obstructions and the like and, in addition, to provide such a construction so arranged that the tool may be reset in operating position merely by backing the outfit.

These and other objects and advantages of the present invention will be apparent to those skilled in the art after a consideration of the following detailed description, taken in conjunction with the accompanying drawings in which the preferred form of the invention has been illustrated.

In the drawings:

Figure 1 is a side view of a subsoil device in which the principles of the present invention have been incorporated.

Figure 2 is a plan view of the implement shown in Figure 1.

Figure 3 is a sectional view taken along the line 3—3 of Figure 1.

Figure 4 is a view similar to Figure 1, showing the position of the shank or standard of the tool when the latter has been released, as to clear or pass over obstructions.

Figure 5 is a view similar to Figure 1, showing the position of the tool when it has been swung over into a transport or inoperative position.

Figure 6 is a side view showing the colter attachment.

Figure 7 is a section taken along the line 7—7 of Figure 6.

Referring now more particularly to Figures 1 and 2, the subsoil plow is indicated in its entirety by the reference numeral 1 and is adapted to be connected to a tractor 2 or other source of power. The beam of the subsoil plow 1 is indicated by the reference numeral 5 and comprises a pair of angles 6 and 7, connected together at their forward ends by a bolt 8 and spaced apart at their rear ends by a spacer 9 which, as will be referred to later, forms an abutment member to which the tool is latched. As indicated in Figure 1, the beam 1 is normally disposed at a slight angle to the horizontal, and secured, as by bolts 12, to the rear end of each of the angles 6 and 7, is a pair of relatively short ground engaging shoes 13. Each shoe 13 comprises a rearmost ground engaging portion 14 and a forward slightly angled section 15, the latter being apertured to receive the attaching bolts 12. The shoes 13 are spaced apart, corresponding to the distance between the beam angles 6 and 7. The angularity of the parts is such that when the front end of the beam 1 is connected to the tractor 2, the rear sections 14 of the shoes 13 are generally horizontal and engage the ground surface.

Secured to the rear portions of the angles 6 and 7 is a pair of upwardly and rearwardly extending bracket plates 17 and 18. Along the lower edge of each bracket plate is a plurality of apertures to receive fastening bolts 21 which also extend through apertures in the spacer member 9 and in registering apertures in the vertical flanges of the angles 6 and 7. When the bolts 21 are tightened the rear ends of the angles 6 and 7 are fixed in laterally spaced apart relation and at the same time the spacer 9 and the bracket plates 17 and 18 are rigidly secured in position. The upper portion of each of the bracket plates 17 and 18 is apertured to receive a pivot pin 25 which pivotally connects the upper end of a vertical shank or standard 26, to the lower end of which a subsoil tool 27 is connected. The shank or standard 26 extends downwardly through the space between the shoes 13 and the rear ends of the angles 6 and 7. The point 27, together with the shank or standard 26, is adapted to be swung rearwardly and upwardly in the event the point strikes a stump, stone or other obstruction during operation. The forward edge of the shank is sharpened, as at 30.

A latching member 31 is pivoted at its rear end to the shank 26 and at its forward end is releasably connected with the abutment member 9. Preferably, the latch member 31 is made up of a pair of straps 32 and 33, the rear end of each of which is apertured to receive a pivot pin 35 which passes through any one of a number of openings 36 formed in the shank or standard 26. Likewise, a plurality of openings 37 are provided in the upper end of the shank or standard 26, through any one of which the upper pivot pin 25 is disposed. By removing the pins 25 and 35 and inserting them in different openings 36 and 37, the position of the tool 27 may be raised or lowered. The front end of each of the strap members 32 and 33 is extended forwardly, as at 41 and 42, and a pin 43 is fixed to the front portion of the straps 32 and 33 in such position that it is adapted to engage in front of an abutment section 44 that is formed on the upper side of the spacer member 9. If desired, a roller 45 may be mounted on the pin 43.

For controlling the latching and unlatching of the tool 27, there is provided a trip lever 61 which is pivoted, as at 62, to the frame angles 6 and 7 and has a lower apertured ear 63 which is formed to receive the rear end of a spring 64, the front end of which is connected, as by a bolt or pin 65, to the beam 1. The trip lever 61 is formed with a lower nose section 67, which is adapted to underlie the pin 43, and an upper section 68 which overlies the pin 43 when the latter is in a position engaging the abutment nose 44. A cable C is attached to the upper end 69 of the trip lever 61.

If, during operation, the point 27 strikes a stone or other immovable object, the operator exerts a forward pull through the cable C onto the trip lever 61, pulling the upper end thereof forwardly. This forces the nose 67 up against the pin 43 and disengages it from the abutment section 44. The shank and tool is then free to swing rearwardly and upwardly, clearing itself of the obstruction, as shown in Figure 4. The latch member 31 moves rearwardly with the rearward swinging movement of the shank or standard 26. The latch member 31 is confined between the bracket plates 17 and 18 and the strap members 32 and 33 straddle the nose portion 44 of the abutment member, except when the tool is released. Therefore, after release, the outfit may be backed, which rocks the tool forwardly and downwardly into an operating position, the pin 43 being guided into a position in front of the nose portion 44 by the upper trip lever section 68, which section is adapted to ride over the pin 43 and hold the latter in position, under the action of the spring 64.

In normal operation, the beam 1 extends forwardly and upwardly at a slight angle, and the shoes 13 are constructed and arranged to bear only on the soil behind the shank or standard 26. When constructed as shown and described above, there is ample clearance for trash and the like to free itself from the implement without tending to raise the tool out of the ground. This latter effect is also due to the fact that the shoes 13 make only a relatively small area of contact with the ground. Moreover, the sharpened edge 30 tends to cut through trash and the like so that there is little tendency for trash and the like to gather on the shank 26.

The implement may be arranged for transport by releasing the trip lever 61 and then manually swinging the shank or standard 26 rearwardly upwardly and over into a position overlying the beam, as shown in Figure 5. In order to hold the tool in this position, there is provided a spacing bushing 71 mounted on a bolt 72 that extends through the two bracket plates 17 and 18. The bolt 72 is so placed that when the tool shank or standard is swung rearwardly, upwardly and over into its transport position, the tool shank is thus supported in that position by the bolt 72. When the standard 26 is thus swung into an inoperative position the latch member 31, being pivotally connected to the standard 26, moves with the latter into its transport position. However, the parts are so constructed and arranged that the abutment-engaging pin 43 is adapted to engage an adjacent part of the subsoil shoe 27 and thus prevent the latch member from swinging out of position.

For operating under very trashy conditions, we prefer to employ a colter attachment indicated in its entirety in Figure 6 by the reference numeral 80. The colter attachment comprises a rolling colter 81 on opposite sides of which is secured a pair of hub members 83 and 84 secured to the colter disk 81 in any suitable manner, such as three bolts 85. The colter 81 and its hub members are mounted for rotation on a sleeve 87 which is disposed over a clamping bolt 88 and between a pair of colter brackets 93. Each of the latter is provided with a hook section 91 and a lower apertured portion 92 receiving the ends of the bolt 88. The hook portions 91 of the colter brackets 93 are apertured to receive the bolt 88, and the parts are so proportioned and dimensioned that when the colter bracket sections 91 are hooked over the horizontal flanges of the beam angles 6 and 7 and the bolt 88 tightened, the two brackets are clamped firmly to the beam angles with a pinching action on the sleeve 87 caused by generally rocking movement of the brackets about the edges of the angle flanges as axes.

When the bolt 88 is loosened, the colter attachment may be shifted manually either forwardly or rearwardly, as desired, to adjust the depth of operation of the colter disk 81.

While we have shown and described above the preferred structure in which the principles of the present invention have been illustrated, it is to be understood that our invention is not to be limited to the particular details, shown and described above, but that, in fact, widely different means may be employed in the practice of the broader aspects of our invention.

What we claim, therefore, and desire to secure by Letters Patent is:

1. A subsoil plow comprising a generally fore and aft extending beam including a pair of members connected together at their front ends and spaced apart at their rear ends, a pair of brackets extending upwardly from said beam and fixed at their lower portions to the rear portions of said members in laterally spaced apart relation, a subsoil tool including a shank extending generally upwardly between said brackets and pivoted to the latter at its upper end, an abutment fixed to said beam members in a position forward of said shank, a latch member comprising a pair of straps pivoted to said shank and disposed on opposite sides of the latter, said strap members extending along opposite sides of said abutment member and forwardly thereof and having a part carried between said strap members and adapted to engage said abutment member, and a release lever pivoted to said beam and disposed between said strap members.

2. The invention set forth in claim 1, further characterized by means on said trip lever for guiding the latch member into locking engagement with said abutment member.

3. In a subsoil plow or the like having a beam member and a shank member pivoted to the upper rear portion of the beam member and swingable, when released, rearwardly, latching mechanism for holding said shank in operative position, comprising an abutment carried by said beam forward of said shank, a pair of straps pivoted to said shank on opposite sides thereof, a part carried by said straps between the latter and adapted to engage in front of said abutment member, said straps extending forwardly beyond said part, and a trip lever pivoted to said beam and disposed between the forward extended portions of said strap members and having a first section adapted to engage said part, whereby when said trip lever is moved in one direction, said part is released from said abutment member, and a second section adapted to react against said part for guiding the latter into an abutment-engaging position when the shank is swung forwardly relative to said beam after a release therefrom.

4. A subsoil plow comprising a generally fore and aft extending beam member having a pair of upstanding brackets at its rear end disposed in spaced apart relation, a subsoil tool including a generally vertically disposed shank pivotally connected at its upper end to the upper ends of said brackets and swingable rearwardly therefrom upon release from said beam, means for releasably connecting said standard to said beam, and an abutment on said brackets forward of said standard for supporting the latter when it is swung rearwardly and then upwardly and forwardly into a transport position generally over said beam.

5. A subsoil plow comprising a generally fore and aft extending beam including a pair of members spaced apart at their rear ends, a pair of upstanding brackets fixed, respectively, to said members, a subsoil tool including a generally vertically disposed shank pivoted at its upper end to the upper ends of said brackets and swingable rearwardly and upwardly about said pivot, as upon encountering an obstruction, ground engaging shoe means carried by said members and supporting at least the rear portion of said beam during transport, latching mechanism for holding said standard in operative position including a member pivoted to said standard and extending forwardly along said beam between said brackets and means for releasably engaging said last named member with said beam, said last named member being shiftable rearwardly from its position between said brackets when the subsoil tool is swung rearwardly and upwardly away from its operative position, and means on said brackets for supporting said tool shank and said latching member pivoted to the shank when the latter has been swung into a transport position.

6. In a subsoil plow, a pair of laterally spaced apart brackets, a subsoil tool including a shank pivoted at its upper end to the upper end of said brackets and swingable rearwardly and upwardly therefrom and over into a position extending generally forwardly, a latching member pivoted to said shank and normally disposed between said brackets but being swingable away from the latter when said shank is swung upwardly and over into its transport position, means on said bracket for holding said shank in its transport position, and means on said latching member engageable with said subsoil tool for holding said latching member in its transport position.

7. The invention set forth in claim 6, further characterized by a beam member to which said brackets are fixed, said latching member comprising a pair of straps disposed on opposite sides of and pivoted to said shank, an abutment member carried by said beam between said brackets, a part on said straps releasably engageable with said abutment member, a trip lever carried by said beam and engageable with said part for disengaging the latter from said abutment member, said part being engageable with said subsoil tool when the latter is in its transport position to prevent said latch member from swinging out of its transport position when the subsoil tool is in its transport position.

8. A subsoil plow comprising a generally fore and aft extending beam, a shank pivotally connected at its upper end with said beam and carrying a subsoiler point at its lower end, a latch member pivotally connected to said shank, an abutment carried at the forward end of said latch member, an abutment section carried by said beam forward of said shank to releasably receive said abutment for locking said shank in position, and a trip lever pivoted to said beam adjacent said abutment section, said trip lever including a first part overlying said abutment for holding the latter in engaged position with said abutment section and a second portion underlying said abutment and adapted when said trip lever is swung forwardly to positively disengage said abutment from said abutment section for releasing said shank.

9. In a subsoil plow or the like having a beam member and a shank member pivoted to the upper rear portion of the beam member and swingable, when released, rearwardly, latching mechanism for holding said shank in operative position, comprising an abutment carried by said beam forward of said shank, a lock member pivotally connected with said shank, a part carried by said lock member and adapted to engage in front of said abutment member, and a trip lever movably connected with said beam and having a first section adapted to engage said part, whereby when said trip lever is moved in one direction, said part is released from said abutment member, and a second section adapted to act against said lock member for guiding said part into an abutment-engaging position when the shank is swung forwardly relative to said beam after a release therefrom.

10. In a subsoil plow or the like having a beam member and a shank member pivoted to the upper rear portion of the beam member and swingable, when released, rearwardly, latching mechanism for holding said shank in operative position, comprising an abutment carried by said beam forward of said shank, a lock member pivotally connected with said shank, a part carried by said lock member and adapted to engage in front of said abutment member, and a trip lever movably connected with said beam and having a first section adapted to engage said part, whereby when said trip lever is moved in one direction, said part is released from said abutment member, and a second section adapted to react against said part for holding the latter in an abutment-engaging position.

CURTISS L. COOK.
AUSTIN E. YOUNG.

REFERENCES CITED

The following references are of record in the file of this patent:

UNITED STATES PATENTS

| Number | Name | Date |
|---|---|---|
| 856,200 | Allin | June 11, 1907 |
| 1,525,873 | Lock | Feb. 10, 1925 |
| 1,611,011 | Ferguson | Dec. 14, 1926 |
| 1,625,278 | Paul | Apr. 19, 1927 |
| 1,855,604 | Lindeman | Apr. 26, 1932 |
| 2,401,139 | Cook | May 28, 1946 |

FOREIGN PATENTS

| Number | Country | Date |
|---|---|---|
| 402,506 | Great Britain | Dec. 7, 1933 |